United States Patent [19]

Oda et al.

[11] Patent Number: 4,623,017
[45] Date of Patent: Nov. 18, 1986

[54] JOINT STRUCTURE FOR A TUBE AND A HEADER

[75] Inventors: Noriyuki Oda, Chiba; Nobuyuki Kido, Fujisawa; Keiji Muramatsu, Ichikawa, all of Japan

[73] Assignee: Asahi Glass Company Ltd., Tokyo, Japan

[21] Appl. No.: 588,366

[22] Filed: Mar. 12, 1984

[30] Foreign Application Priority Data

Mar. 15, 1983 [JP] Japan ............................ 58-36308[U]
Mar. 15, 1983 [JP] Japan ............................ 58-36309[U]

[51] Int. Cl.⁴ .............................................. F28F 7/00
[52] U.S. Cl. ...................... 165/82; 165/158; 165/173; 285/137.1
[58] Field of Search ............... 165/173, 175, 178, 158, 165/DIG. 10, 82, 81; 285/137 R; 277/DIG. 6, 72 FM, 14 R

[56] References Cited

U.S. PATENT DOCUMENTS

| | | | |
|---|---|---|---|
| 1,714,703 | 5/1929 | Walton | 165/173 |
| 1,814,010 | 7/1931 | Snow | 165/82 X |
| 2,164,628 | 7/1939 | Sibley | 165/175 |
| 2,458,756 | 1/1949 | Watson | 165/82 X |
| 3,226,136 | 12/1965 | Braden | |
| 3,262,489 | 7/1966 | Fritzberg | 165/158 |
| 3,633,660 | 1/1972 | Young | 165/173 X |
| 3,765,706 | 10/1973 | Bram | 165/178 |
| 4,245,696 | 1/1981 | van der Lely | 165/158 X |
| 4,323,115 | 4/1982 | Stafford et al. | 165/158 X |
| 4,355,636 | 10/1982 | Oetjen et al. | 165/DIG. 10 X |

FOREIGN PATENT DOCUMENTS

| | | | |
|---|---|---|---|
| 0021111 | 7/1981 | European Pat. Off. | 165/158 |
| 1064966 | 9/1959 | Fed. Rep. of Germany | 165/178 |
| 1138332 | 10/1959 | Fed. Rep. of Germany | 165/158 |
| 2711112 | 9/1978 | Fed. Rep. of Germany | 277/DIG. 6 |
| 2137971 | 5/1972 | France | 165/82 |
| 2015146 | 9/1979 | United Kingdom | 165/158 |
| 2057083 | 3/1981 | United Kingdom | 165/173 |
| 2068525 | 12/1981 | United Kingdom | 165/158 |

Primary Examiner—Albert W. Davis, Jr.
Assistant Examiner—Peggy A. Neils
Attorney, Agent, or Firm—Oblon, Fisher, Spivak, McClelland & Maier

[57] ABSTRACT

A joint structure for at least one tube and a header, wherein the header comprises a gas chamber, a sand chamber filled with a sealing sand and a partition plate dividing the gas chamber and the sand chamber, and the tube extends from the exterior of the header through the sand chamber and has its one end open in the gas chamber.

18 Claims, 3 Drawing Figures

JOINT STRUCTURE FOR A TUBE AND A HEADER

SUMMARY OF THE INVENTION

The present invention relates to a joint structure for a tube and a header, and more particularly to a joint structure for a tube such as a heat conductive ceramic tube to be used primarily at high temperatures and a header receiving the open end of such a tube.

For the convenience of description, a reference is made to a heat exchanger comprising a gas channel through which a heating gas such as a high temeprature combustion gas flows and a plurality of transversely extending heat conductive tubes through which a gas to be heated, flows. In such a heat exchanger, the heat conductive tubes extend through the wall of the gas channel and project with their open ends located outside the channel wall, and the projected portions and the open ends of the tubes are enclosed by a header. It has been proposed to secure such a header to the channel wall and thus provide a joint structure for the tubes and the header. After being assembled, the heat exchanger of this type is heated and used at a high temperature. Thus, there is a considerable temperature difference between at the time of the assembling and at the time of its use. Further, even during the use, there will be a substantial temperature difference and temperature distribution between the heat conductive tubes in which a gas to be heated flows and the channel wall along which a heating gas flows. Furthermore, both the gas to be heated and the heating gas undergo temperature changes as time passes. Due to such temperature differences, temperature distribution and temperature changes, there will be a difference in the thermal expansion degrees between the heat conductive tubes and the channel wall, whereby a thermal stress will be created. Further, in many cases, such a heat exchanger takes a form of a heavy large size structural installation, whereby a mechanical stress will be created by the weight of the installation itself, by the load caused by the manufacturing error or by other external forces.

In order to prevent a deformation or breakage of the parts of the heat exchanger due to such thermal stress or mechanical stress, it is desired to enlarge the through-holes for heat conductive tubes provided in the channel wall so that their diameter is larger than the outer diameter of the conductive tubes and thereby provide a structure which permits relative displacement of the heat conductive tubes and the channel wall. However, such a structure permits leakage of gases through the clearances between the through-holes and heat condutive tubes, whereby the heating gas and the gas to be heated will be mingled, such being undesirable.

Likewise, even if the header enclosing the open ends of the heat conductive tubes, is secured to the projected portions of the heat conductive tubes instead of being secured to the channel wall, the above-mentioned problem still remains so long as the header is secured additionally to other supporting means. Whereas, if the header is secured to and supported solely by the projected portions of the heat conductive tubes as proposed in Japanese Unexamined Patent Publication No. 29993/1984, the projected portions will have to bear the heavy header and excessive loads will be exerted to the projected portions, whereby deformation or breakage of the heat conductive tubes is likely to result. In order to avoid such difficulties, a complicated supporting system will be required. Another joint structure has been proposed in Japanese Unexamined Patent Publication No. 210489/1983. However, this joint structure is applicable only to a system where the header is provided at an upper portion of the system. Besides, the joint structure has relatively poor durability.

Accordingly, it is an object of the present invention to solve the above-mentioned difficulties and provide a joint structure for tubes and a header whereby the gas flowing in the tubes and header is prevented from leakage and mixing with the gas or air flowing in the gas channel, and at the same time, relative displacement of the gas channel or the header and the tubes is permitted so as to prevent excessive thermal stress or mechanical stress from being exerted to these parts.

It is another object of the present invention to provide a joint structure for a tube and a header, whereby the above-mentioned air-tightness can readily be secured.

A further object of the invention is to provide a joint structure for a tube and a header, whereby the above-mentioned air-tightness can be maintained for a long period of time.

A still further object of the invention is to provide a joint structure for a tube and a header, which can be employed for a compact heat exchanger unit.

Namely, the present invention provides a joint structure for at least one tube and a header, wherein the header comprises a gas chamber, a sand chamber filled with a sealing sand and a partition plate dividing the gas chamber and the sand chamber, and the tube extends from the exterior of the header through the sand chamber and has its one end open in the gas chamber.

DESCRIPTION OF THE DRAWINGS

Now, the present invention will be described in detail with reference to the preferred embodiments.

In the accompanying drawings.

DETAILED DESCRIPTION OF THE PREFERRED EMBODIMENTS

Figure 1:
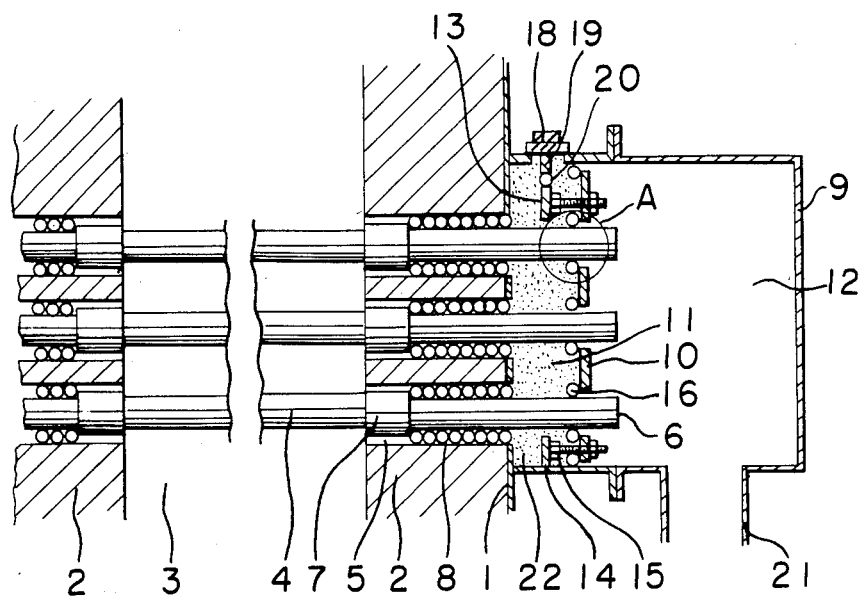
FIG. 1 is a cross sectional view of the essential portion of a heat exchanger as an embodiment of the present invention.

Now, the present invention will be described with reference to the drawings. In the high temperature heat exchanger illustrated in FIG. 1, a gas channel 3 having a cross section of a rectangular shape or any other shape, is defined by a support structure 2 which is constructed with a refractory material such as castable refractories and has an outer linning of an iron plate 1. In the gas channel 3, a combustion waste gas having a high temperature, e.g. as high as at least 900° C., flows as a heating gas in a vertical direction. In the gas channel 3, a plurality of tubes 4 made of e.g. ceramics and having a thin wall thickness, extend horizontally in parallel with one another, through which a gas to be heated, flows. The tubes 4 extend through through-holes 5 formed in the support structure 2 and the iron plate 1, and the open ends 6 of the tubes 4 are located outside the iron plate 1. Outer tubes 7 preferably made of the same material as the tubes 4 are fixed on the tubes 4 at the portions of the tubes 4 located at the inner side of the support structure 2. The inner diameter of the through-holes 5 is larger than the outer diameter of the outer tubes 7 to secure clearances therebetween. Along the periphery of the portions of the tubes 4 located at the outer side of the support structure 2, a cushion 8, e.g. a rope made of a heat resistant inorganic fiber, is wound on the tubes 4 to fill the clearances between the tubes 4 and the through-holes 5.

Outside the iron plate 1, a header 9 is provided to enclose the projected portion or portions of a tube 4 or tubes 4 and secured to the iron plate 1. The interior of the header 9 is divided by a partition plate 10 which extend to contact the inner wall of the header and the periphery of the tubes. A sand chamber 11 is formed inside the partition wall 10, and the sand chamber is filled with a sealing sand 22 such as fine sand or the like which is capable of establishing an air-tight sealing. A gas chamber 12 is formed outside the partition wall 10, and the open ends 6 are located in the gas chamber 12.

A baffle plate 13 is provided at an upper portion of the sand chamber 11, and the baffle plate is air-tightly secured to both side walls of the sand chamber. At a lower portion of the sand chamber 11, a support plate 14 is secured to the bottom surface of the sand chamber. The baffle plate 13 and the partition plate 10, and the support plate 14 and the partition plate 10, are respectively connected by elongated bolts 15, whereby the partition wall 10 is securely supported, and at the same time, the partition wall 10 is movable in the axial direction of the tubes 4 by adjusting the degree of the screw fastening of the elongated bolts. The mechanism which makes the partition wall 10 movable, is not restricted to the above mechanism. For instance, airtight slits may be provided on the side walls of the header so that portions of the partition wall protrude through the slits out of the header and the protruded portions of the partition wall may be manipulated by a suitable means to move the partition wall in the axial direction of the tubes, or the partition plate may be connected to the gas chamber wall facing the partition plate, by means of elongated bolts so that its position is adjustable by adjusting the degree of screw fastening of the bolts.

Figure 2:
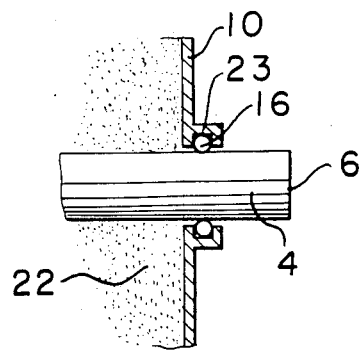
FIG. 2 is a cross sectional view of a portion corresponding to portion A in FIGS. 1 and 3, but representing another embodiment.

If necessary, a sealing member 16 may be provided at the portions where the partition plate 10 is in contact with the tubes 4 and with the inner wall of the header, whereby the sealing sand 22 is prevented from leaking into the gas chamber 12. In FIG. 1, the sealing member 16 is in contact with the partition plate 10 from the sand chamber 11 side. This arrangement is sufficient in a case where the movement of the partition plate 10 is restricted in one direction i.e. from the gas chamber side to the sand chamber side. However, in order to make the partition plate 10 movable in both directions, i.e. towards both the gas chamber side and the sand chamber side, it is preferred that, as shown in FIG. 2, a groove 23 is provided along the periphery of the partition plate 10 and the sealing member 16 is fitted in this groove 23. This arrangement may be applied not only to the portion where the partition plate 10 is in contact with the tubes 4, but also at the portion where the partition plate 10 is in contact with the inner wall of the header.

At an upper portion of the sand chamber 11, an upper lid 18 is provided to air-tightly close the upper opening of the sand chamber, through which the sealing sand may be introduced or the interior of the sand chamber may be inspected. A projection 19 extends downwardly from the center of the lower surface of the upper lid 18, and this projection 19 is air-tightly in contact with the upper edge of the baffle plate 13 via a sealing ribbon 20 and with both side walls of the sand chamber. Thus, the upper lid 18, the projection 19, the seal ribbon 20 and the baffle plate 13 are associated to constitute a baffle which air-tightly divides the upper portion of the sand chamber to an extent from the top surface of the sand chamber downwardly to a proper level. Further, the gas chamber 12 is connected with a conduit 21 for communication with the gas chamber of the adjacent header.

The sealing ribbon 20 and the sealing member 16 may be made of the same material as the cushion 8, e.g. a rope of heat resistant inorganic fiber.

Figure 3:
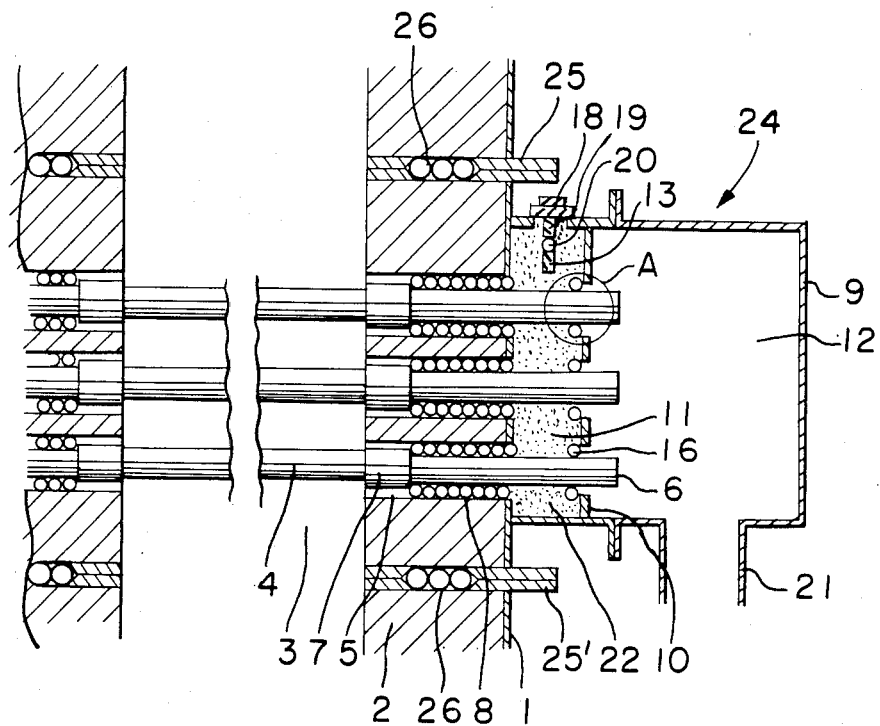
FIG. 3 is similar to FIG. 1 but represents another embodiment of the present invention.

FIG. 3 illustrates another embodiment of the present invention. The high temperature heat exchanger of FIG. 3 is the same as the heat exchanger of FIG. 1 except that the heat exchanger units 24 are connected to one another, the partition plate 10 is secured to the inner wall of the header, and the elongated bolts 15 and the support plate 14 used in the embodiment of FIG. 1 are eliminated. Namely, the heat exchanger of FIG. 3 comprises a plurality of heat exchanger units 24 which are connected to one another by flanges 25. A flange sealing member 26 made of e.g. a rope of heat resistant organic fiber, is interposed between the adjacent heat exchanger units. The header 9 is secured to an iron plate 1, and the interior of the header is divided by a partition plate 10 which is in contact with the inner wall of the header and the periphery of the tubes. In FIG. 3, the same parts as in FIG. 1 are identified by the same reference numerals so as to refrain from repetition of their description.

In FIG. 3, the sealing member 16 is in contact with the partition plate 10 from the sand chamber 11 side. This arrangement is effective for a case where the relative displacement of the partition plate and the tubes due to the difference in the thermal expansion, is small, or the sealing member 16 is adequately pressed against the partition plate 10 by the sealing sand 22. In a case where the relative displacement between the partition plate and the tubes is great due to the difference in the thermal expansion, it is preferred to employ an arrangement as shown in FIG. 2, wherein a groove 23 is provided along the periphery of the partition plate 10 and the sealing member 16 is fitted in the groove 23. This arrangement may be employed not only at the portion where the partition plate 10 is in contact with the tubes 4 but also at the portion where the partition plate 10 is in contact with the inner wall of the header.

Having thus described the joint structure for the tubes and the header, it should be noted that the joint structure brings about the following effects. Namely, if the tubes 4 and the support structure 2 are intimately and fixedly connected, a thermal stress or mechanical stress is likely to form between the tubes and the support structure due to such factors as the difference in the thermal expansion coefficient, the manufacturing error between at the time of manufacturing such parts and at the time of installing them, or a displacement which takes place during the use for an extended period of time because of their heavy weight. It is likely that the joint portion will be broken by such thermal or mechanical stress. Particularly, for the recovery of heat energy of high temperature gas, it has been desired to employ ceramic tubes since metal tubes such as steel tubes are not durable at such a high temperature. How- ever, ceramics are brittle or weak against such stress. Whereas, in the heat exchanger shown in FIG. 1 or FIG. 3, the through-holes 5 are designed to be larger than the outer diameters of the tubes 4 and outer tubes 7, and the tubes are supported via flexible cushions 8 by the support structure, so as to permit the relative displacement in a direction vertical to the axis of the tubes as well as the relative displacement in a direction parallel to the axis of the tubes, whereby the formation of excessive stress is avoided, and thus the deformation and breakage are prevented. Further, a sand chamber 11 is provided between the support structure 2 and the gas chamber 12, and a sealing sand 22 is filled in the sand chamber, whereby the inflow, into the gas chamber, of the heating gas flowing in the gas channel, or the outflow, from the header, of the gas to be heated, flowing in the tubes and the gas chamber, is prevented. The sealing sand permits the relative displacement of the tubes in the sand chamber.

The header is secured to and supported by the supporting structure, whereby the load of the header is borne by the support structure. Accordingly, the tubes are not required to support the load of the header, and the tubes are thus free from possible deformation or breakage for this reason, whereby the material for the tubes can be selected from a wider range, and it is particularly advantageous that ceramics tubes can thereby be employed.

When the heat exchanger is assembled or to be used, the sealing sand is filled substantially to the top end of the sand chamber. However, the sealing sand introduced from the top, is not necessarily fully packed in the sand chamber, and inadequately packed portions are likely to remain due to a bridging phenomenon, etc. In such a case, the air-tightness at such inadequately packed portions will be inadequate. Especially when there is a substantial difference in the pressure between the heating gas or the atmospheric air and the gas to be heated, these inadequately packed portions gradually become densely packed under the influence of the vibration during the use, and consequently, a void space will be formed in the sealing sand. If such a void space grows, an air passage will eventually be formed in the sand chamber, particularly at portions where the sealing sand is normally in contact with the tubes or with the inner wall of the sand chamber. The cushions 8 and the sealing members 16 serve to prevent the leakage of the sealing sand, but they do not necessarily adequately serve to prevent the leakage of gases. Thus, for instance, the gas to be heated, is likely to leak into the heating gas, such being undesirable. Whereas, according to the present invention, the movable partition plate 10 as shown in FIG. 1 may be moved in the sand chamber packed with the sealing sand, from the gas chamber side to the sand chamber side, whereby the sealing sand will be pressed and inadequately packed portions, if any, will be reduced or diminished. It is thereby possible to maintain substantially all the sealing sand in a densely packed state and thereby to secure the air-tightness in the sand chamber, and it is possible to maintain the adequately packed state for an extended period of time. The partition plate may be moved at the time when the sealing sand is filled or when the heat exchanger is inspected. Further, by this arrangement, it is possible to adjust the thickness of the sealing sand layer depending upon the pressure difference or the type of the gas used, and it is thereby possible to select the optimum air-tight condition for each case. When the partition plate 10 is movable, it will also be easy to dismount the partition plate 10, whereby it is possible to readily withdraw the tubes 4 in the axial direction for the purpose of e.g. inspection or repair.

Further, when a heat exchanger having no baffle is used for an extended period of time, it is likely that the sealing sand leaks more or less from e.g. the cushion 8, or it may happen that during the use, the sealing sand is powdered and lost due to e.g. abrasion or wearing, whereby the amount of the sealing sand in the sand chamber will decrease and the level of the sealing sand lowers, thus leading to inadequate air-tightness.

Whereas, in a preferred embodiment of the present invention, a baffle is employed, which provides the same air-tightening effectiveness as the case where the thickness of the sealing sand layer is increased. Further, if the partition plate 10 is movable, the baffle plate 13 serves as a fulcrum for the movement of the partition plate 10. The baffle is not limited to the specific construction as described above. Any baffle may be useful so long as it is capable of air-tightly divide the upper portion of the sand chamber from the top surface of the sand chamber downwardly to a proper depth. For instance, it may be constituted only by the upper lid 18 having the projection 19. Or, it may be a baffle provided separately as secured to the top surface of the sand chamber. Further, a plurality of baffles may be provided.

As shown in FIG. 3, according to the present invention, it is possible to accommodate the whole heat exchanger unit 24 except for the conduit 21, within both planes of flanges 25 and 25', and yet it is possible to design to minimize the distance between the two planes, whereby a compact heat exchanger unit is obtainable.

In the present invention, the header may be secured or may not be secured to the support structure. When the header is secured to the support structure as shown in FIGS. 1 and 3, the support structure 2 preferably not only supports the tubes 4 but also acts as the channel wall defining the gas channel. However, the support structure for holding the tubes and the channel wall may be constructed independently.

Further, the header may be projected outwardly from the support structure. For instance, if the support structure is thick, a part or whole of the header may be embedded in the support structure. Further, it is a merit of the present invention that the tubes may extend horizontally as illustrated by the preferred embodiments. However, the arrangement of the tubes is not restricted to the illustrated embodiments, and the tubes may extend vertically or in any suitable direction. Thus, the header may be located at the side of the support structure as illustrated, or it may be located above or beneath the support structure. Likewise, the direction of the heating gas flow may not necessarily be restricted to the vertical direction as illustrated, and may be in a horizontal direction or in any other suitable direction. However, it is preferred that the gas flow direction is perpendicular to the axial direction of the tubes. The outer tubes 7 are not essential, and instead of the outer tubes, a protrusion may be provided on the inner surface of the through hole 5 to prevent the displacement of the cushion 8.

In the present invention, a single tube may be provided to extend into a single header. However, it is advantageous that a plurality of tubes are provided to extend from the exterior of a single header through a single sand chamber and have their open ends located in a single gas chamber. The latter is simpler in the construction than the former, and the operation for packing the sealing sand is easier in the latter than in the former.

In the preferred embodiments, a heating gas flows in the gas channel while a gas to be heated flows in the tubes. However, it is possible to supply a gas to be heated to the gas channel and a heating gas to the tubes. Further, the pressure of the gas in the tubes may be the same or different from the pressure of gas in the gas channel or atmospheric pressure. The pressure may optionally be selected within a range in which the air-tightness can be maintained by the sealing sand layer. If the gas pressure in the tubes is higher than the gas pressure or atmospheric pressure in the gas channel, the gas pressure in the gas chamber becomes high, whereby the partition plate 10 will be pressed towards the sand chamber, which is effective for the maintenance of the air-tightness by the sand chamber.

Further, in the present invention, the wall of the gas chamber may be constituted independently from the support structure, or as illustrated by the preferred embodiments, a part of the wall of the gas chamber may be constituted by the support structure or the iron plate. As the sealing sand, a suitable material and particle size may be selected depending upon the temperature conditions or the corrosive conditions under which the joint structure of the present invention is to be used. However, inorganic particles having a particles size of at most 0.3 mm, preferably at most 0.05 mm, are usually preferred to secure the air-tightness. For example, the inorganic particles may be made of diatomaceous earth, silica, cordierite, graphite, boron nitride, etc.

Thus, the joint structure of the present invention is useful for a heat exchanger, particularly for a high temperature heat exchanger wherein a heating gas having a temperature of some hundreds degree in centigrade is used. It is also useful for a device for mixing fluids, a device for controlling the temperature, a device for changing the flow direction, a dust collecting apparatus, etc. When used for a dust collecting apparatus, the tubes 4 may be made of a gas permeable porous material which serves as a filter, and ceramics tubes are preferred.

What is claimed is:

1. A joint structure comprising:
   at least two tubes;
   a support structure for said tubes;
   mounting means for mounting said tubes in said support structure and for permitting relative motion therebetween;
   a header for said tubes; and
   dividing means disposed in said header, contacting opposite walls thereof and extending across said header, thereby dividing said header into a gas chamber and a sealing chamber, said dividing means comprising a partition plate having an opening therein, said tubes passing in order through said support structure, through said sealing chamber, through said opening of said partition plate, and into said gas chamber, open ends of said tubes being disposed in said gas chamber, wherein said sealing chamber is filled with a gas-sealing means consisting essentially of sand packed around said tubes.

2. The joint structure according to claim 1, wherein said tubes are mounted in passage means of said support structure and said mounting means is disposed in said passage means and comprises means for permitting relative motion of said tubes and said support structure in both axial and transverse directions of said tubes.

3. The joint structure according to claim 1, wherein the tubes are ceramic.

4. The joint structure according to claim 1, further comprising compressing means for compressing said sand, said compressing means comprising means for adjusting the position of said partition plate.

5. The joint structure according to claim 3, further comprising compressing means for compressing said sand, said compressing means comprising means for adjusting the position of said partition plate.

6. The joint structure according to claim 1, wherein the header is secured to the support structure holding the tubes.

7. The joint structure according to claim 3, wherein the header is secured to the support structure holding the tubes.

8. The joint structure according to claim 4, wherein the header is secured to the support structure holding the tubes.

9. The joint structure according to claim 1, wherein the tubes extends horizontally.

10. The joint structure according to claim 3, wherein the tubes extend horizontally.

11. The joint structure according to claim 4, wherein the tubes extend horizontally.

12. The joint structure according to claim 1, wherein a baffle plate is provided at an upper portion in the sealing chamber.

13. The joint structure according to claim 3, wherein a baffle plate is provided at an upper portion in the sealing chamber.

14. The joint structure according to claim 4, wherein a baffle plate is provided at an upper portion in the sealing chamber.

15. The joint structure according to claim 1, wherein a heating gas or a gas to be heated is passed in the tubes in a heat-exchanging manner with a gas to be heated or a heating gas passed outside the tubes.

16. The joint structure according to claim 15, wherein the tubes are ceramic.

17. The joint structure according to claim 1, wherein the tubes are gas-permeable porous tubes functioning as filters.

18. The joint structure according to claim 17, wherein the tubes are ceramic.

* * * * *